United States Patent
Sowa et al.

(12) 
(10) Patent No.: US 6,621,610 B2
(45) Date of Patent: Sep. 16, 2003

(54) LIGHT DEFLECTIVE OPTICAL SYSTEM

(75) Inventors: Takeshi Sowa, Nagano-Ken (JP); Nozomu Inoue, Nagano-Ken (JP); Takashi Suzuki, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/113,945

(22) Filed: Apr. 2, 2002

(65) Prior Publication Data

US 2002/0167709 A1 Nov. 14, 2002

(30) Foreign Application Priority Data

Apr. 3, 2001 (JP) ........................................ 2001-104668
Feb. 12, 2002 (JP) ........................................ 2002-033500

(51) Int. Cl.$^7$ .............................................. G02B 26/08
(52) U.S. Cl. ...................... 359/212; 359/214; 359/216; 359/223
(58) Field of Search ................................ 359/212–219, 359/221, 223, 225, 226, 850, 857; 347/256, 260, 261

(56) References Cited

U.S. PATENT DOCUMENTS

| 4,796,965 A | 1/1989 | Ishikawa |
| 5,136,415 A | * 8/1992 | Bean ........................... 359/213 |

FOREIGN PATENT DOCUMENTS

| JP | 51-6563 | 1/1976 |
| JP | 61-7818 | 1/1986 |

* cited by examiner

Primary Examiner—James Phan
(74) Attorney, Agent, or Firm—Sughrue Mion, PLLC

(57) ABSTRACT

The present invention relates to a light deflective optical system without necessity of use of a plane mirror of which width is narrow, which can prevent variation in pitch of scan lines even with projecting or sinking of a deflective reflecting facet and can prevent a deflective light beam from twisting. The light deflective optical system has at least one deflective reflecting facet 11, capable of being revolved or swiveled about the rotational axis 12, and two stationary plane mirrors 13, 14, disposed to face the deflective reflecting facet 11, wherein a light beam a1 incident on and thus reflected at the deflective reflecting facet 11 is reflected successively at the stationary plane mirrors 13, 14 and this reflected light beam a3 is again incident on and reflected at the deflective reflecting facet 11. Assuming as an incident plane as a face containing a light beam a0 to be first incident on the deflective reflecting facet 11 and being parallel to the rotational axis 12, the light beam a0 to be first incident on the deflective reflecting facet 11 passes through a space 15 between the stationary plane mirrors 13, 14 and the deflective light beam a4 after second reflection at the deflective reflecting facet 11 passes through the space 15.

6 Claims, 19 Drawing Sheets

When deflective reflecting facet is revolved by rotational angle ω

When deflective reflecting facet is directed squarely

FIG. 15(a)
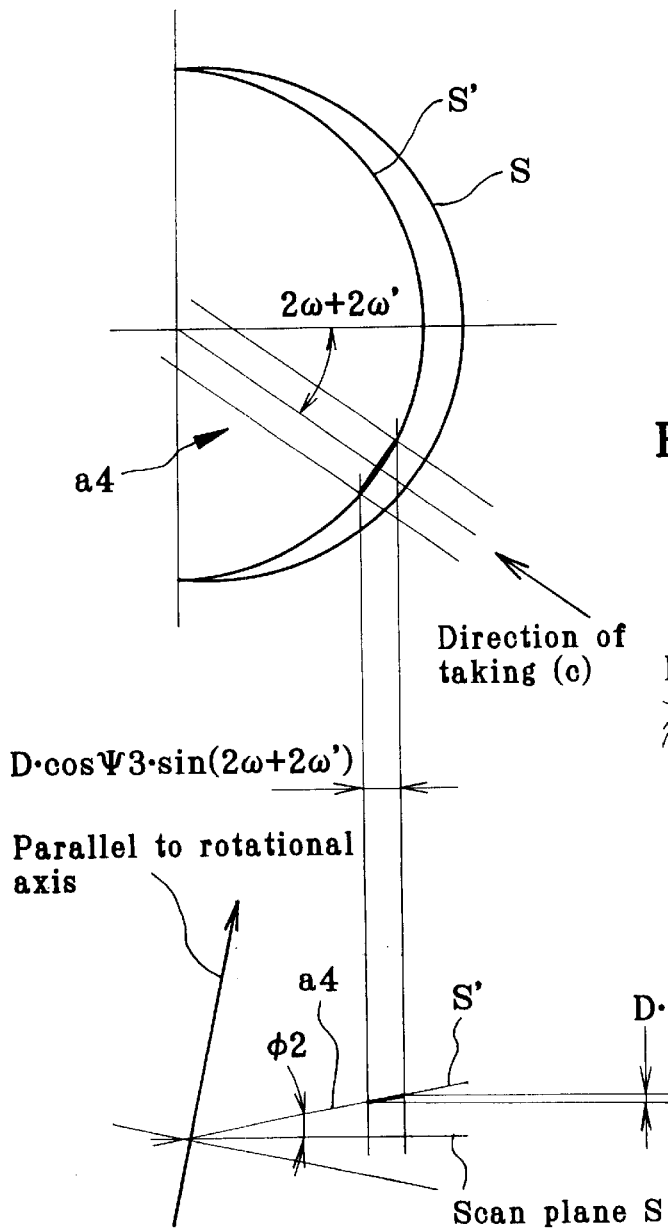
FIG. 15(c)
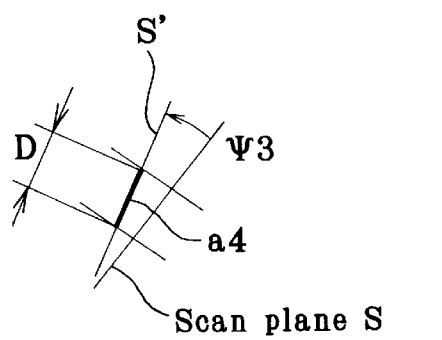
FIG. 15(b)

P2: Second reflection point

LIGHT DEFLECTIVE OPTICAL SYSTEM

BACKGROUND OF THE INVENTION

The present invention relates to a light deflective optical system to be used for exposure during image writing process in an image forming apparatus such as laser beam printers and, more particularly, to a light deflective optical system in which a light beam is reflected twice at a deflective reflecting facet of a rotary-type polygon mirror or the like.

Conventionally, a system comprising at least one deflective reflecting facet, capable of being revolved or swiveled about its rotational axis, and two stationary plane mirrors located to face the deflective reflecting facet has been proposed by Japanese Unexamined Patent Publication S51-6563. In this system, a deflected light beam being reflected at the deflective reflecting facet is successively reflected at the two plane mirrors and is incident again on the deflective reflecting facet so as to be deflected, thereby correcting variations in direction of outputting the deflected light beam which occur due to a tilt of the rotational axis or a tilt of the deflective reflecting facet.

Another system comprising at least one deflective reflecting facet, capable of being revolved or swiveled about its rotational axis, and two stationary plane mirrors located to face the deflective reflecting facet wherein the line of intersection of these plane mirrors extends at a right angle to the rotational axis of the deflective reflecting facet has been proposed by Japanese Unexamined Patent Publication S61-7818 (U.S. Pat. No. 4,796,965). In this system, a light beam is incident on the deflective reflecting facet from a position between the deflective reflecting facet and the two stationary plane mirrors so as to be reflected at the deflective reflecting facet. The reflected light beam is successively reflected at the two plane mirrors and is again incident on and reflected at the deflective reflecting facet. Then, the reflected light beam is outputted through a space between the deflective reflecting facet and the two stationary plane mirrors or between the two stationary plane mirrors, thereby correcting distortion of scan lines.

The system proposed by Japanese Unexamined Patent Publication S51-6563 has such a problem that the deflection angle should be set small in order to prevent interference between the two stationary plane mirrors and an incoming light beam or an outgoing light beam.

On the other hand, the system proposed by Japanese Unexamined Patent Publication S61-7818 is not designed to solve a problem of a case of the deflective reflecting facets being comprised of a rotary-type polygon mirror or the like, that the pitches of scan lines vary due to projecting or sinking of each deflective reflecting facet with regard to the rotational axis of the polygon mirror as a result of, for example, the eccentricity of the polygon mirror about the rotational axis.

In addition, it is not considered to solve a problem that the deflected light beam is twisted at peripheries of scan lines.

Moreover, the system proposed by Japanese Unexamined Patent Publication S61-7818 should employ a high precise plane mirror of which width is extremely narrow for actual use because the stationary plane mirror is interposed between a light beam to be incident on the deflective reflecting facet and a deflected light beam reflected at the deflective reflecting facet. Such high precise plane mirror is difficult to be processed, so this system must be expensive.

SUMMARY OF THE INVENTION

The present invention has been made in order to solve the aforementioned problems of the conventional systems. It is an object of the present invention to provide a light deflective optical system, in which variation in deflective light beam in the outgoing direction due to tilt of the rotational axis of the deflective reflecting facets and/or tilt of each deflective reflecting facet is completely corrected, and which can take a wider deflecting angle, eliminate the necessity of use of a plane mirror of which width is narrow, prevent variation in pitch of scan lines even with projecting or sinking of the deflective reflecting facet, and further prevent a deflective light beam from twisting.

A light deflective optical system achieving the aforementioned object comprises at least one deflective reflecting facet, parallel to a rotational axis and capable of being revolved or swiveled about said rotational axis, and two stationary plane mirrors, disposed to face the deflective reflecting facet, wherein a light beam incident on and thus reflected at said deflective reflecting facet is reflected successively at said two stationary plane mirrors and this reflected light beam is again incident on and reflected at said deflective reflecting facet, and is characterized in that said two stationary plane mirrors are disposed perpendicularly to an incident plane to have a space therebetween on the condition that said incident plane is defined as a face containing a light beam to be first incident on said deflective reflecting facet and being parallel to said rotational axis, and the light beam to be first incident on said deflective reflecting facet passes through the space between said two stationary plane mirrors and the deflected light beam after second reflection at said deflective reflecting facet outputs through the space between said two stationary plane mirrors.

In this case, it is preferable that the following condition is satisfied:

$$0.92 \leq (\theta 2/\theta 1) \leq 1.25 \tag{30}$$

wherein $\theta 1$ indicates the incidence angle of the light beam to be first incident on the deflective reflecting facet relative to the deflected reflecting facet under conditions that the incident plane contains the deflected light beam of the first reflection and $\theta 2$ indicates the outgoing angle of the deflected light beam of the second reflection at the deflective reflecting facet under conditions that the incident plane contains the deflected light beam of the second reflection.

In addition, it is preferable that the following condition is satisfied:

$$0.1 \cdot |\beta' \cdot (\sin \theta 1 - \sin \theta 2)| \leq 0.25 \cdot LP \tag{35}$$

wherein assuming the shifting amount of the outgoing light beam in a section containing said rotational axis as Y which is generated due to projecting or sinking of said deflective reflecting facet with respect to said rotational axis and assuming the shifting amount of the scanning point on a scanned surface corresponding to the shifting amount Y as Y' which is generated due to an optical system between the second reflection point on said deflective reflecting facet and the scanned surface, $\beta'$ is defined as $\beta'=Y'/Y$ and LP is the pitch of scan lines on said scanned surface, with dimensions being in millimeters.

In this case, the following condition is further preferably satisfied:

$$0.1 \cdot |\beta' \cdot (\sin \theta 1 - \sin \theta 2)| \leq 0.125 \cdot LP \tag{36}$$

with dimensions being in millimeters.

The image forming apparatus is preferably characterized by satisfying the condition of $\theta 1 : \theta 2 \approx 1 : 1$.

For example, the light deflective optical system of the present invention may be used for exposure during image writing process of an image forming apparatus.

According to the present invention, a light deflective optical system can be provided, in which variation in deflective light beam in the outgoing direction due to tilt of the rotational axis of the deflective reflecting facets and/or tilt of each deflective reflecting facet is completely corrected, and which can take wider deflecting angle, employ relatively wide plane mirrors can be employed as the stationary plane mirrors. That is, cheaper high precise plane mirrors which are easy to be processed can be employed as the stationary plane mirrors. In addition, the light deflective optical system can prevent variation in pitch of scan lines even with projecting or sinking of the deflective reflecting facet and prevent the outgoing light beam from twisting.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 15($a$)–15($c$) are illustrations showing a relation between a plane S', containing a coordinate axis 1' and the central ray of the outgoing light beam a4, and a scan plane S when a scan line has a curvature and a deflecting angle is $2\omega+2\omega'$;

DESCRIPTION OF THE PREFERRED EMBODIMENTS

The principle and embodiments of a light deflective optical system of the present invention will now be described in detail with reference to the accompanying drawings.

Figure 1:
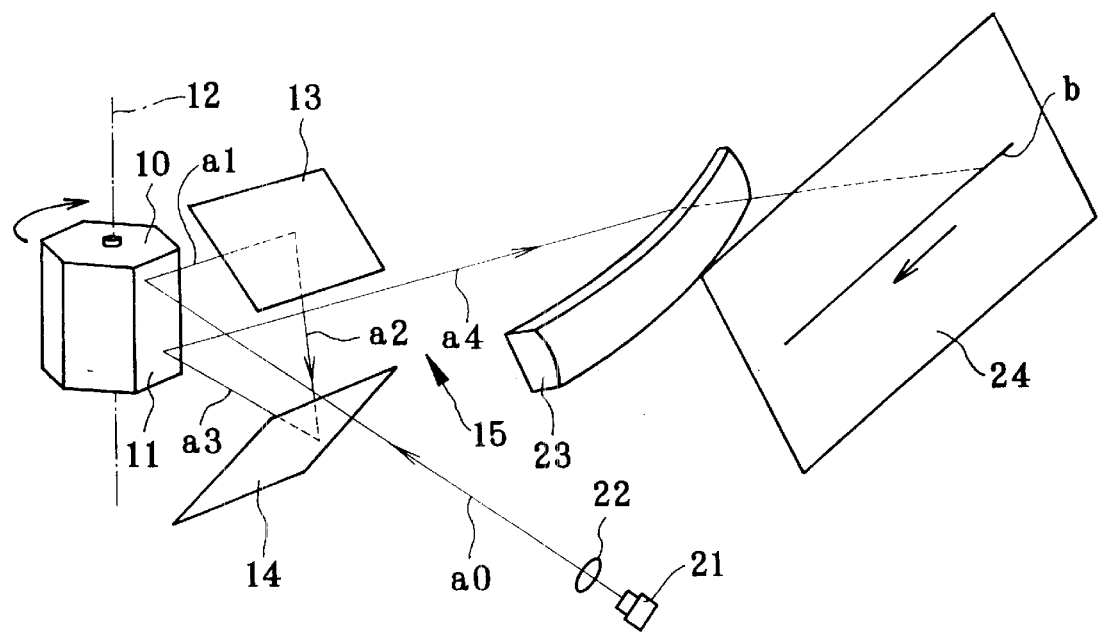
FIG. 1 is a perspective view showing the entire structure of an optical scanning apparatus including a light deflective optical system of the present invention.
Figure 2:
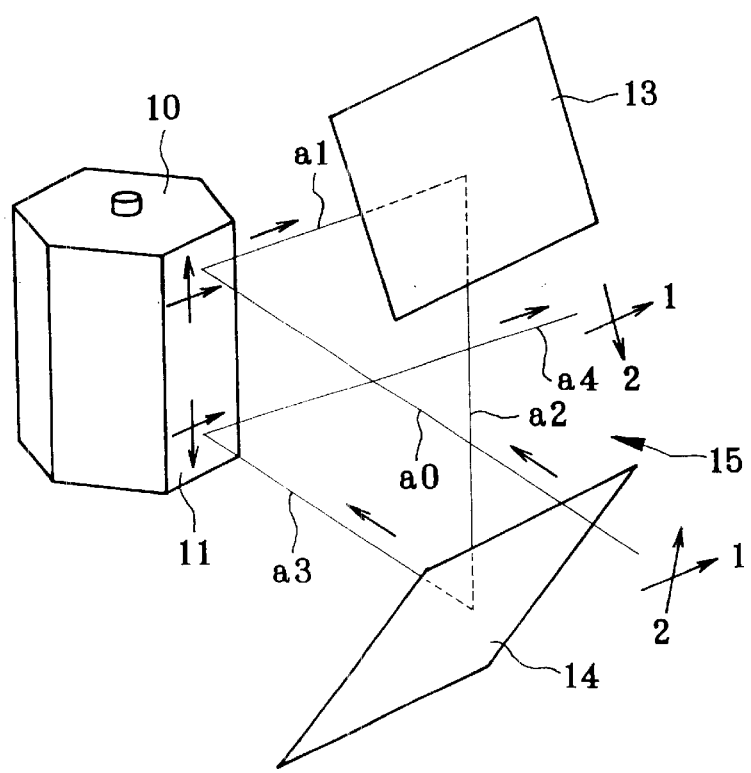
FIG. 2 is a perspective view showing the light deflective optical system of the present invention as main parts of the optical scanning apparatus.

FIG. 1 is a perspective view showing the entire structure of an optical scanning apparatus including a light deflective optical system of the present invention and FIG. 2 is a perspective view showing the light deflective optical system as main parts of the optical scanning apparatus.

According to this structure, an optical deflector is composed of a polygon mirror 10 taking a form of a polygonal column and having a plurality (six in the illustrated example) of deflective reflecting facets 11 on the periphery of the polygonal column. The polygon mirror 10 rotates about its rotational axis 12 so that the deflective reflecting facets 11 revolve about the axis 12. Two stationary plane mirrors 13, 14 are disposed to face a deflective reflecting facet 11 related to optical deflection so that these plane mirrors 13, 14 have an angle relative to each other and have a space 15 therebetween.

A light beam from a light source 21 is converted into a collimated light beam a0 by a lens 22 (in case for correcting tilt error, into a light beam collimated in a direction perpendicular to the rotational axis 12 and focused at a position near the deflective reflecting facet 11 in a direction parallel to the rotational axis 12). In the illustrated example, the light beam a0 is incident on the deflective reflecting facet 11, extending parallel to the rotational axis, diagonally from below through the space 15 between the stationary plane mirrors 13 and 14. The light beam a0 becomes a light beam a1 after the first reflection by the deflective reflecting facet 11. The light beam a1 proceeds diagonally upward to be incident on one stationary plane mirror 13. The light beam a1 becomes a light beam a2 after reflection at the stationary plane mirror 13. The light beam a2 proceeds downward to be incident on the other stationary plane mirror 14. The light beam a2 becomes a light beam a3 after reflection at the stationary plane mirror 14. The light beam a3 is incident on the deflective reflecting facet 11 again. The light beam a3 becomes a light beam a4 after second reflection at the deflective reflecting facet 11. The light beam a4 proceeds diagonally upward through the space 15 between the stationary plane mirrors 13 and 14 and is converted into a focused light beam via a scanning optical system 23 and is focused to be incident on a scanned surface 24. Since the deflective reflecting facets 11 revolve about the rotational axis 12, the focused light beam moves at a rotational speed about four times as faster as the rotational speed of the deflective reflecting facets 11 to write a scan line b on the scanned surface 24. Adjacent deflective reflecting facets 11 successively come in and go away the position of incidence of the incoming light beam a0 because of the rotation of the polygon mirror 10. As a result, according to the rotation of the polygon mirror 10, the scan lines b are successively written from one end to the other end on the scanned surface 24 at the same level. The scanning in this direction is called the main scanning. Sub scanning is conducted by moving a scanned substrate on the scanned surface 24 in a direction perpendicular to that of the main scanning at a constant rate. The main scanning and the sub scanning cooperate to achieve raster scanning in which scan lines b are aligned with a constant pitch on the scanned substrate.

The two stationary plane mirrors 13, 14 are disposed perpendicularly to the incident plane on the condition that the incident plane is defined as a face being parallel to the rotational axis 12 and containing the central ray of the incoming light beam a0.

Hereinafter, in such a light deflective optical system, the following discussion will be made for conditions for preventing the outgoing light beam a4 from twisting and conditions preventing the position of the outgoing beam a4 from shifting in the sub scanning direction. The shifting may be caused due to projecting or sinking of the deflective reflecting facets 11 with regard to the rotational axis 12 because the deflective reflecting facets 11 are successively come in and away from the position of incidence of the incoming light beam a0. Problems caused by the twist of the outgoing light beam a4 will be described later.

As a preparation stage, in the structure as shown in FIG. 1 and FIG. 2, difference in angle of reflection of the outgoing light beam a4 (hereinafter, the angle of reflection of the light beam will be sometimes referred to as "outgoing angle") which is caused by deflection of the outgoing light beam a4 will now be studied.

Figure 3:
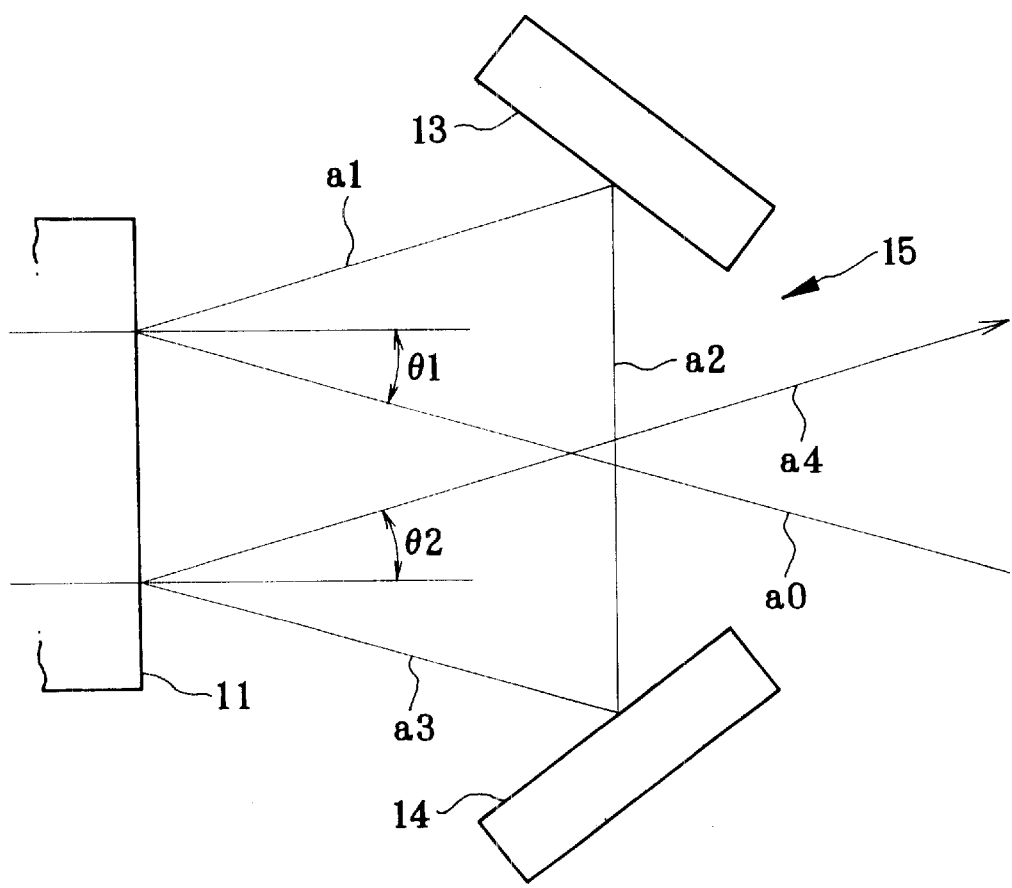
FIG. 3 is an illustration for explaining the definition of a relation between an incidence angle $\theta 1$ of an incoming light beam relative to a deflective reflecting facet and an outgoing angle $\theta 2$ of a outgoing light beam.

As shown in FIG. 3, when the deflective reflecting facet 11 is directed squarely i.e. perpendicularly to the incident plane, all of the light beams a0 through a4 are on the incident plane equal to a plane of paper of the figure. For the following description, it is assumed that the incidence angle of the incoming light beam a0 relative to the deflective reflecting facet 11 is θ1 and the outgoing angle of the outgoing light beam a4 is θ2.

Figure 4:
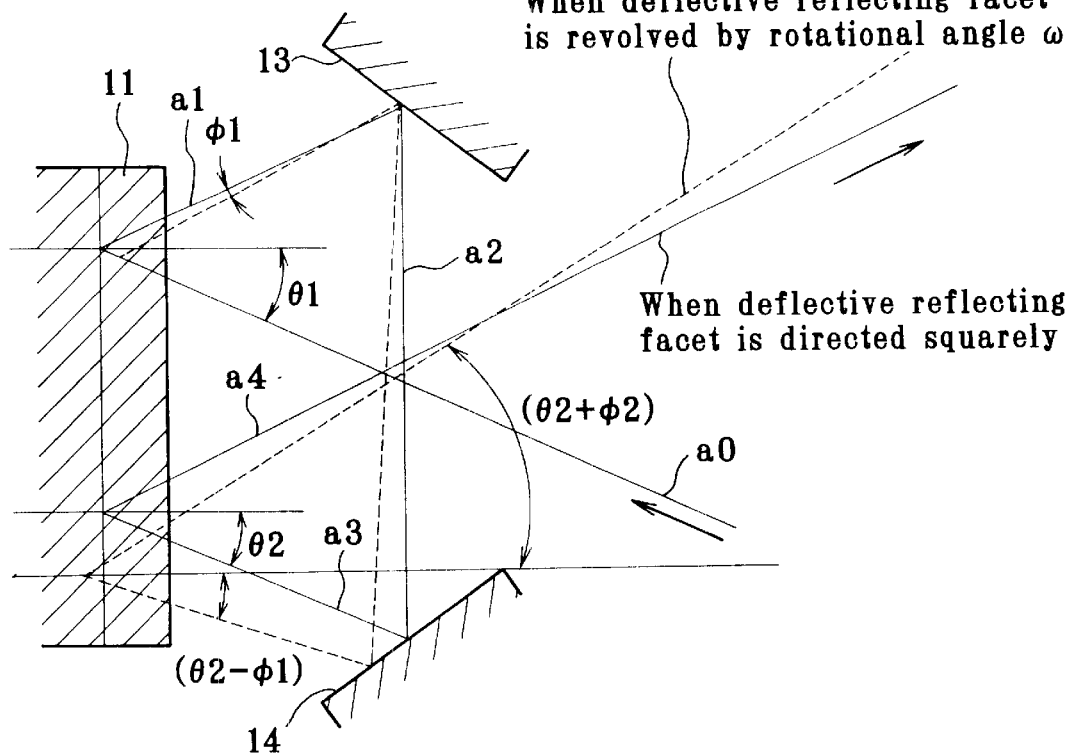
FIG. 4 is an illustration showing a state of light beams as projected on an incident plane.
Figure 5:
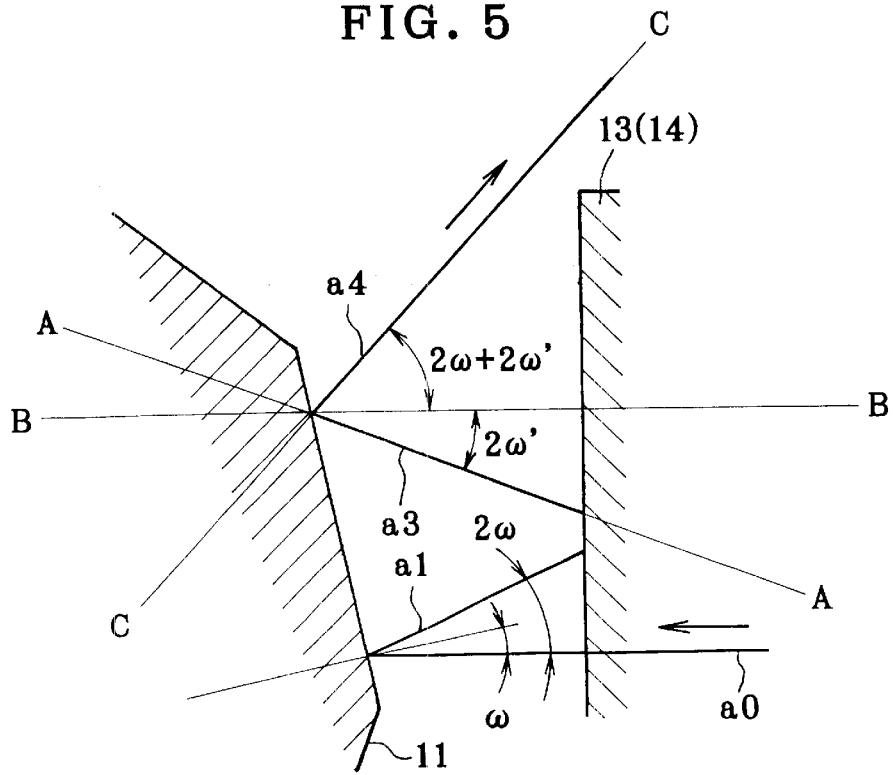
FIG. 5 is an illustration showing a state of the light beams as projected on a plane perpendicular to the rotational axis of the deflective reflecting facets.

FIG. 4 is an illustration showing a state of the light beams a0 through a4 as projected on the incident plane. In this figure, solid lines indicate the state when the deflective reflecting facet 11 is directed squarely so that the light beams a0 through a4 are on the incident plane and dotted lines indicate the state when the deflective reflecting facet 11 is revolved by a rotational angle ω from the position where the deflective reflecting facet 11 is directed squarely. FIG. 5 is an illustration showing a state of the light beams a0 through a4 as projected on a plane perpendicular to the rotational axis 12 of the polygon mirror 10 when the deflective reflecting facet 11 is revolved by a rotational angle ω from the position where the deflective reflecting facet 11 is directed squarely.

Figure 6A:
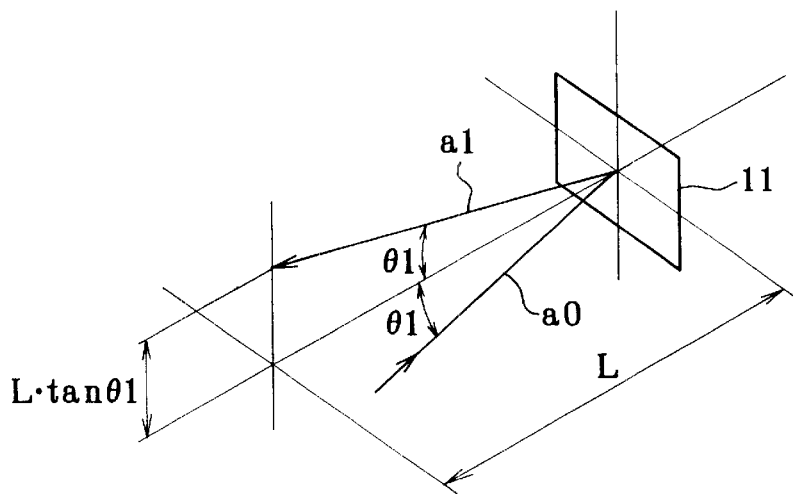
FIGS. 6($a$), 6($b$) are illustrations showing angular relations between the light beams a0, wherein FIG. 6($a$) shows the angular relation between the light beams a0 and a1 when the deflective reflecting facet 11 is directed squarely and FIG. 6($b$) shows the angular relation between the light beams a0 and a1 when the deflective reflecting facet 11 is revolved by a rotational angle $\omega$.
Figure 6B:
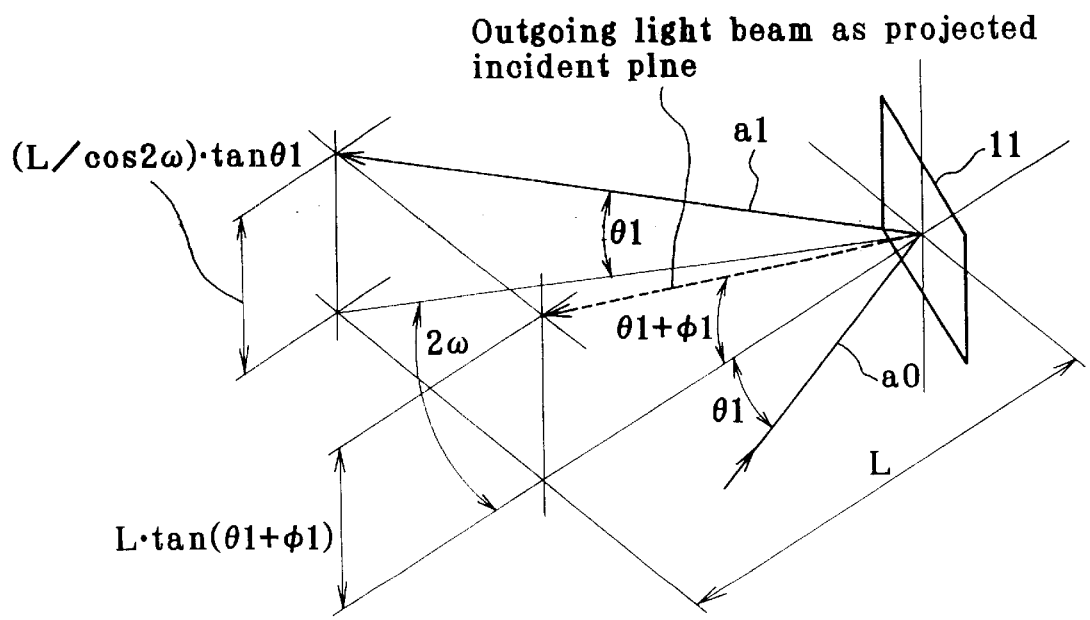
Figure 7:
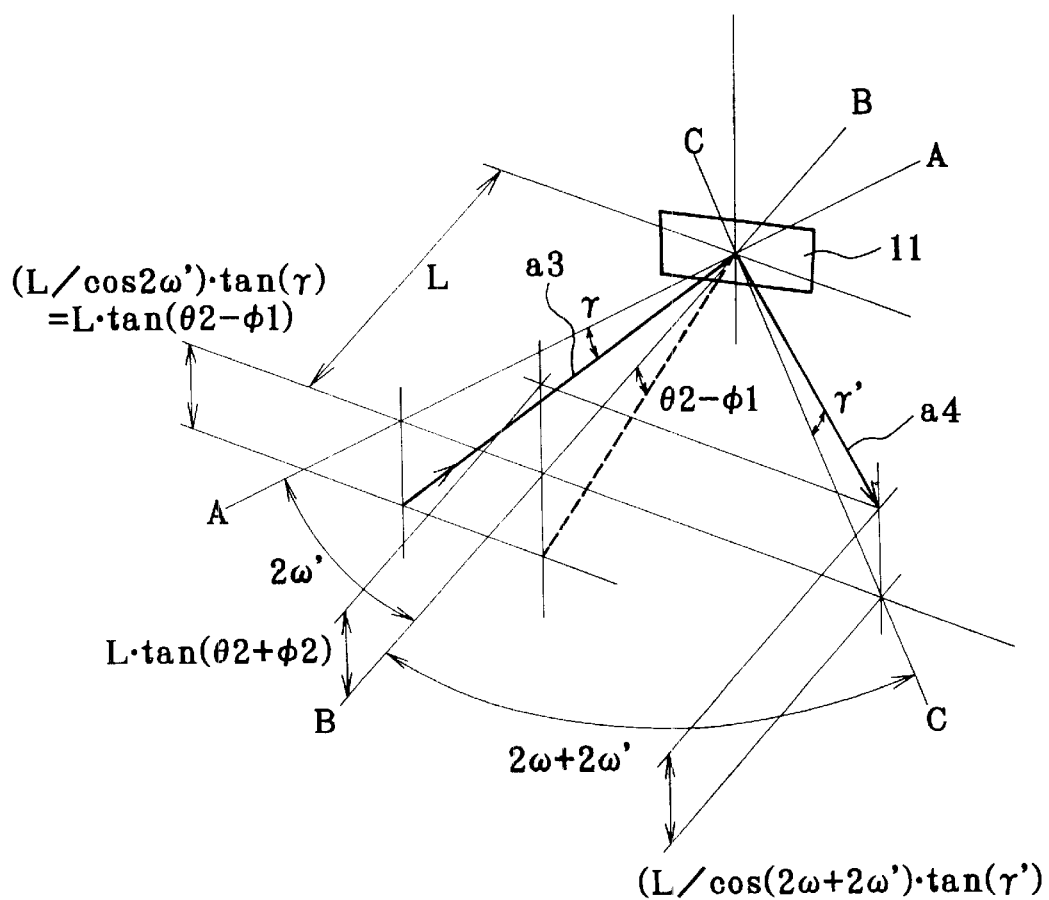
FIG. 7 is an illustration showing an angular relation when the deflective reflecting facet for light beams a3 and a4 is revolved by a rotational angle $\omega$.

FIGS. 6(a), 6(b) are illustrations showing angular relations between the light beams a0 and a1, wherein FIG. 6(a) shows the angular relation between the light beams a0 and a1 when the deflective reflecting facet 11 is directed squarely and FIG. 6(b) shows the angular relation between the light beams a0 and a1 when the deflective reflecting facet 11 is revolved by a rotational angle ω. FIG. 7 is an illustration showing an angular relation between the light beams a3 and a4 when the deflective reflecting facet 11 is revolved by a rotational angle ω. As shown in FIG. 4, φ1 indicates a difference in outgoing angle of the light beam a1, as projected on the incident plane, between the outgoing angle when the deflective reflecting facet 11 is directed squarely and the outgoing angle when the deflective reflecting facet 11 is revolved by the rotational angle ω, and φ2 indicates a difference in outgoing angle of the light beam a4, as projected on the incident plane, between the outgoing angle when the deflective reflecting facet 11 is directed squarely and the outgoing angle when the deflective reflecting facet is revolved by the rotational angle ω. In addition, 2ω' indicates an angle of the light beam a3 relative to the incident plane as projected on a plane perpendicular to the rotational axis 12 of the deflective reflecting facet It when the deflective reflecting facet 11 is revolved by the rotational angle t as shown in FIG. 5.

First, the first deflection will be considered. As apparent from FIG. 6(b), φ1 is given by:

$$L\cdot\tan(\theta1+\phi1)=L\cdot\tan\theta1/\cos 2\omega \quad (1)$$

$$\therefore \phi1=\tan^{-1}(\tan\theta1/\cos 2\omega)-\theta1 \quad (2)$$

Now, the light beam a3 to be incident again upon the deflective reflecting facet 11 will be considered.

Figure 8:
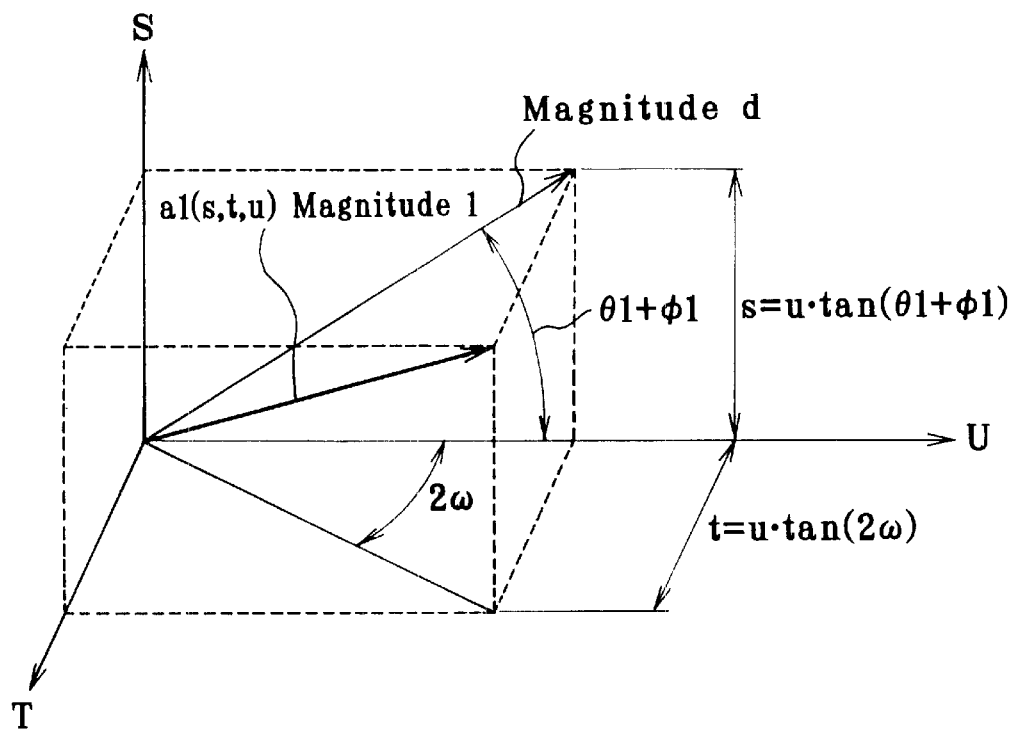
FIG. 8 is an illustration for studying components of the directional vector of the light beam a1 after the first reflection at the deflective reflecting facet.

The following explanation will be made using a coordinate system comprising coordinate axes S, T, and U as shown in FIG. 8, in which the incident plane corresponds to a S-U plane and the plane perpendicular to the rotational axis 12 of the deflective reflecting facets 11 corresponds to a T-U plane. Assuming that components in the axial directions S, T, and U of the directional vector (unit vector) of the light beam a1 after the first reflection at the deflective reflecting facet 11 are represented by (s, t, u), respectively, the following equation is obtained:

$$\sqrt{(s^2+t^2+u^2)}=1 \quad (3)$$

The magnitude d of the directional vector of the light beam a1 as projected on the S-U plane is given by:

$$d=\sqrt{(s^2+u^2)} \quad (4)$$

Because the rotational angle of the deflective reflecting facet 11 is ω, the following equations are obtained:

$$u \cdot \tan 2\omega = t \quad (5)$$

$$u \cdot \tan(\theta 1 + \phi 1) = s \quad (6)$$

From the equations (3), (5), and (6), the following equation can be obtained:

$$u^2 = 1/\{\tan^2(\theta 1 + \phi 1) + \tan^2 2\omega + 1\} \quad (7)$$

From the equations (4), (6), and (7), the following equation can be obtained:

$$d^2 = u^2 \cdot \{\tan^2(\theta 1 + \phi 1) + 1\} = \{\tan^2(\theta 1 + \phi 1) + 1\}/\{\tan^2(\theta 1 + \phi 1) + \tan^2 2\omega + 1\} \quad (8)$$

Figure 9:
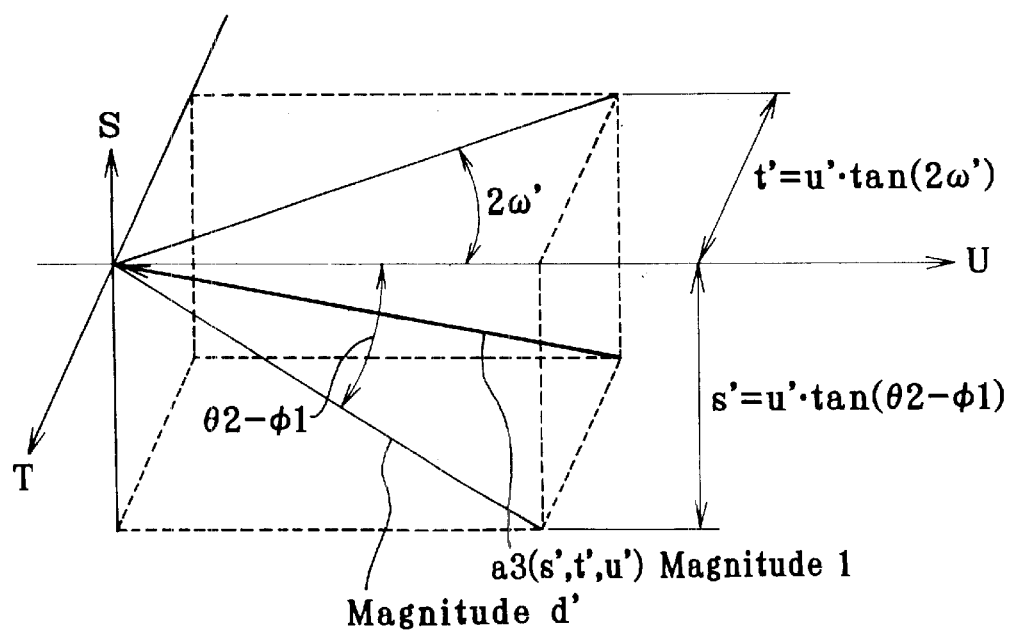
FIG. 9 is an illustration for studying components of the directional vector of the light beam a3 to be incident again on the deflective reflecting facet.

Also as for FIG. 9, using a coordinate system similar to that of FIG. 8 and assuming that components in the axial directions S, T, and U of the directional vector (unit vector) of the light beam a3 to be incident again on the deflective reflecting facet 11 are represented by (s', t', u'), respectively, the following equation is obtained:

$$\sqrt{(s'^2 + t'^2 + u'^2)} = 1 \quad (9)$$

Since the light beam is reflected at the stationary plane mirrors 13 and 14 perpendicular to the S-U plane (incident plane) after the first deflection before the second deflection, the magnitude d' of (s', t', u') as projected on the S-U plane (the magnitude d' of the directional vector of the light beam a3 as projected on the S-U plane) satisfies the condition of d'=d. Therefore, the magnitude d' is given by:

$$d' = d = \sqrt{(s'^2 + u'^2)} = \sqrt{(s^2 + u^2)} \quad (10)$$

Further, the following equations are obtained:

$$u' \cdot \tan 2\omega' = t' \quad (11)$$

$$u' \cdot \tan(\theta 2 - \phi 1) = s' \quad (12)$$

From the equations (9) and (10), the following equation can be obtained:

$$t'^2 = 1 - d^2 \quad (13)$$

From the equations (9), (12), and (13), the following equation can be obtained:

$$u'^2 \cdot \{\tan^2(\theta 2 - \phi 1) + 1\} + (1 - d^2) = 1 \quad (14)$$

$$\therefore u'^2 = d^2/\{\tan^2(\theta 2 - \phi 1) + 1\} \quad (15)$$

From the equations (11) and (15), the following equation can be obtained:

$$|2\omega'| = |\tan^{-1}(t'/u')| = \tan^{-1}[\sqrt{(1-d^2)\{\tan^2(\theta 2 - \phi 1) + 1\}/d^2}] \quad (16)$$

wherein $d^2$ is defined in the equation (8).

Now, the second deflection from the light beam a3 to the light beam a4 will be considered. See A—A section and B—B section (parallel to the incident plane) of FIG. 7. The following equation is obtained:

$$\tan \gamma = \tan(\theta 2 - \phi 1) \cdot \cos 2\omega' \quad (17)$$

Since γ' of C—C section satisfies the condition of γ'=γ, the following equation is obtained:

$$\tan \gamma' = \tan \gamma = \tan(\theta 2 - \phi 1) \cdot \cos 2\omega' \quad (18)$$

When the C—C section is projected on the incident plane, the following equation is obtained:

$$\tan(\theta 2 + \phi 2) = \tan \gamma'/\cos(2\omega + 2\omega') = \cos 2\omega' \cdot \tan(\theta 2 - \phi 1)/\cos(2\omega + 2\omega') \quad (19)$$

As this equation (19) is expanded with regard to φ2, the following equation is obtained:

$$\phi 2 = \tan^{-1}\{\cos 2\omega' \tan(\theta 2 - \phi 1)/\cos(2\omega + 2\omega')\} - \theta 2 \quad (20)$$

The twist of the light beam a4 depends on 41 in the above equation (2) and φ2 in the equation (20) as will be studied hereinafter.

Figure 10:
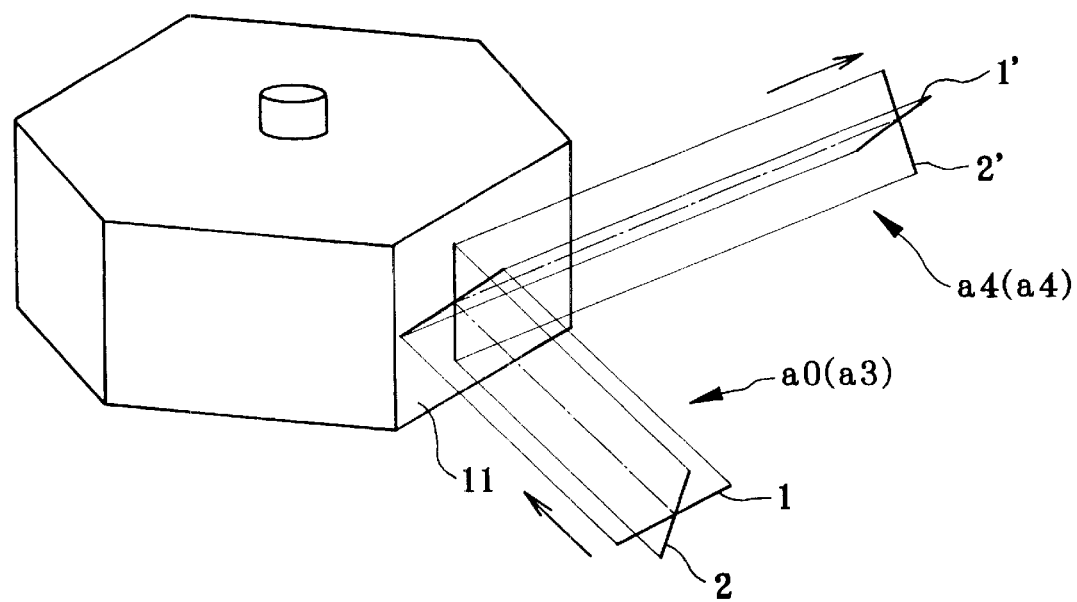
FIG. 10 is an illustration for explaining a coordinate system showing a twist between the incoming light beam and the outgoing light beam.

The twist of the outgoing light beam a4 will now be studied. Assuming that a collimated light beam is incident on the deflective reflecting facet 11, a coordinate system is introduced into the collimated light beam i.e. the incoming light beam a0 (a3) as shown in FIG. 10. By using this coordinate system, the rotation of the coordinate axes will be considered. In FIG. 10, "1" represents a coordinate axis, set in the incoming light beam a0, which is perpendicular to the incident plane and "2" represents the other coordinate axis which is perpendicular to the central ray and to the coordinate axis 1. The scan plane is defined as a plane which contains a ray reflected at the deflective reflecting facet 11 within the incident plane and is perpendicular to the incident plane.

As the incoming light beam a0 (a3) is reflected at the deflective reflecting facet 11, the coordinate axes 1, 2 are converted into coordinate axes 1', 2'. The state that the outgoing light beam al (a4) is not twisted defined as the state that the coordinate axis 1' is parallel to the scan plane.

The twist angle of the outgoing light beam al (a4) due to deflection is defined as an angle between a plane, containing the coordinate axis 1' after deflection and the central ray, and the scan plane.

The twist angle of the outgoing light beam a4 which is generated by the deflection of "1" of the incoming light beam a0 will be expressed as follows. The deflection of "1" may be caused when "1" is reflected twice at the deflective reflecting facet 11.

Figure 11A:
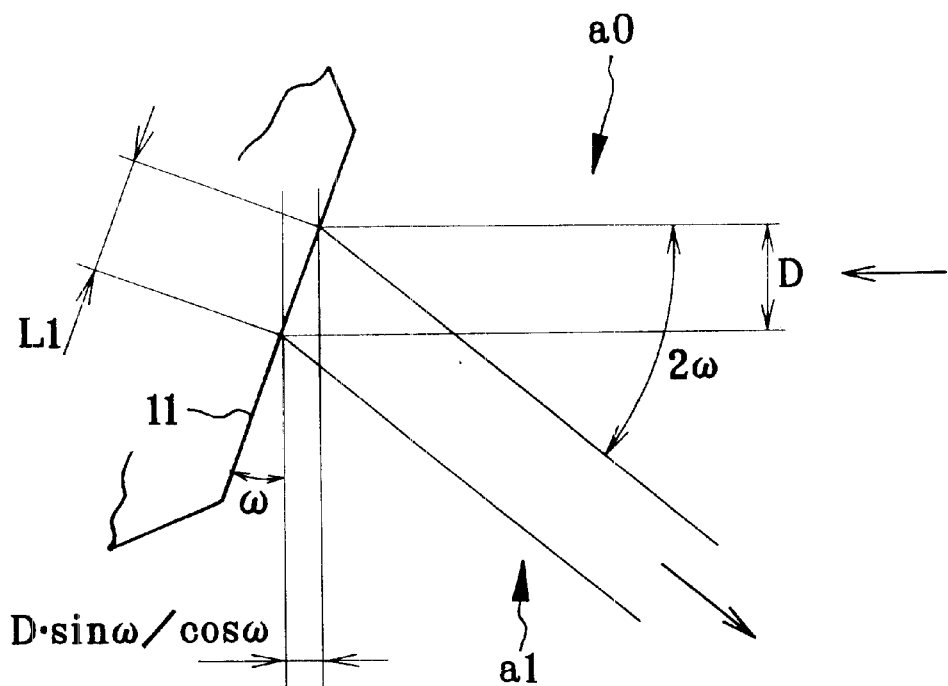
FIGS. 11($a$), 11($b$) are illustration for explaining the twist angle $\psi 1$ generated on the light beam a1 which is created from the incoming light beam a0 by one reflection and deflection at the deflective reflecting facet 11.
Figure 11B:
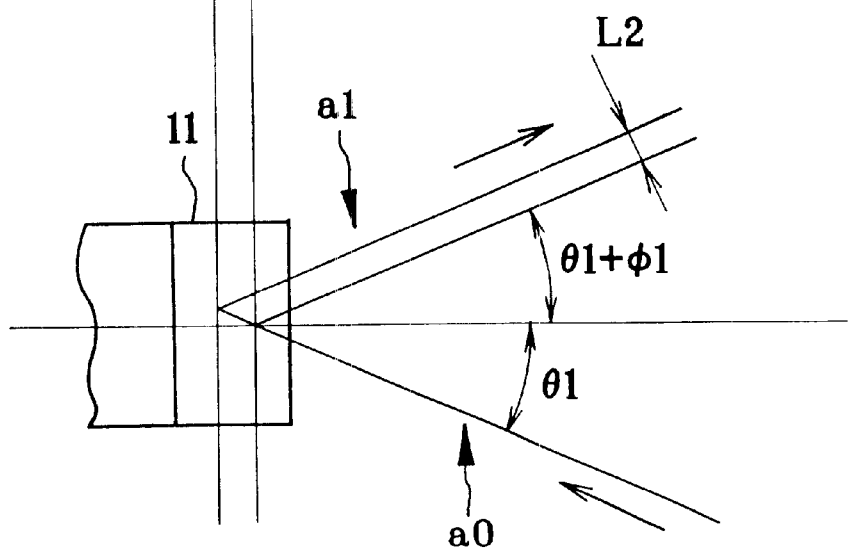
Figure 12A:
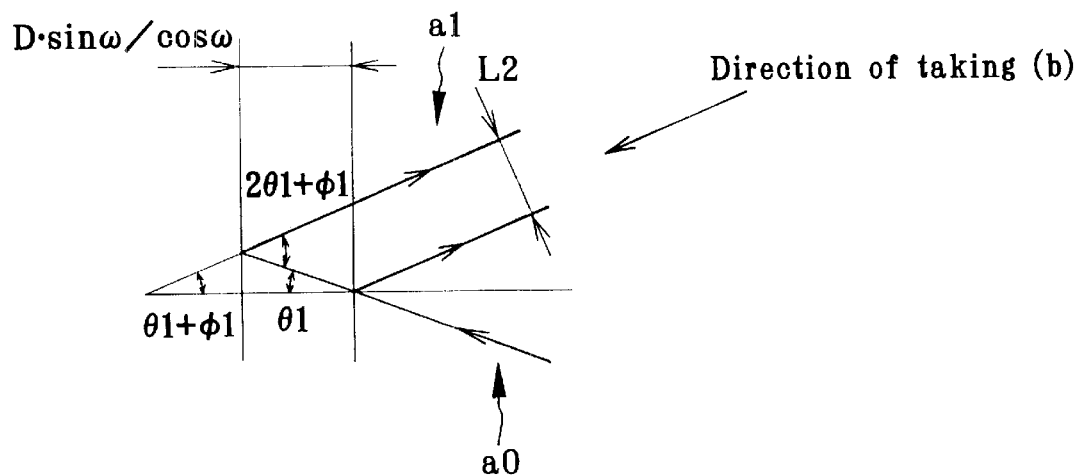
FIGS. 12($a$), 12($b$) are illustrations for explaining the twist angle $\psi 1$ generated on the light beam a1 deflected at the first reflection.
Figure 12B:
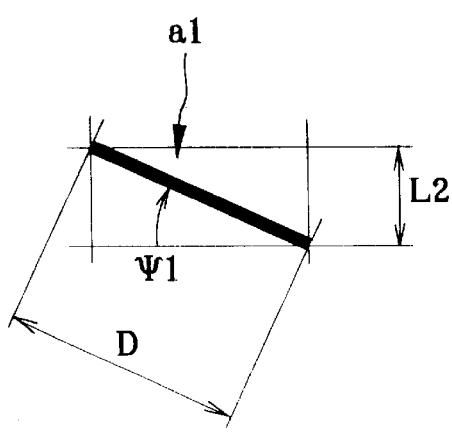

FIGS. 11(a), 11(b) and FIGS. 12(a), 12(b) are illustrations for explaining the twist angle ψ1 generated on the light beam a1 which is the incoming light beam a0 after reflected at the deflective reflecting facet 11 and thus deflected. FIG. 11(a) is an illustration in which the beams are projected on a plane perpendicular to the rotational axis 12, FIG. 11(b) is an illustration in which the beams are projected to the incident plane, FIG. 12(a) is an enlarged view of a portion including a reflection point shown in FIG. 11(b), and FIG. 12(b) is a view showing the front of the light beam a1 as seen from the proceeding direction of the light beam a1.

From FIGS. 11(a), 11(b) and FIGS. 12(a), 12(b), using marks in these figures, the following equations are obtained:

$$L1 = D/\cos \omega \quad (21)$$

$$L2 = D \cdot \sin(2 \cdot \theta 1 + \phi 1) \cdot \sin \omega/(\cos \theta 1 \cdot \cos \omega) \quad (22)$$

The twist angle ψ1 of the light beam a1 due to the first reflection in the light deflective optical system in which the beam is reflected twice as shown in FIG. 1 is given by:

$$\psi 1 = \sin^{-1}\{\sin(2 \cdot \theta 1 + \phi 1) \cdot \sin \omega/(\cos \theta 1 \cdot \cos \omega)\} \quad (23)$$

Figure 13A:
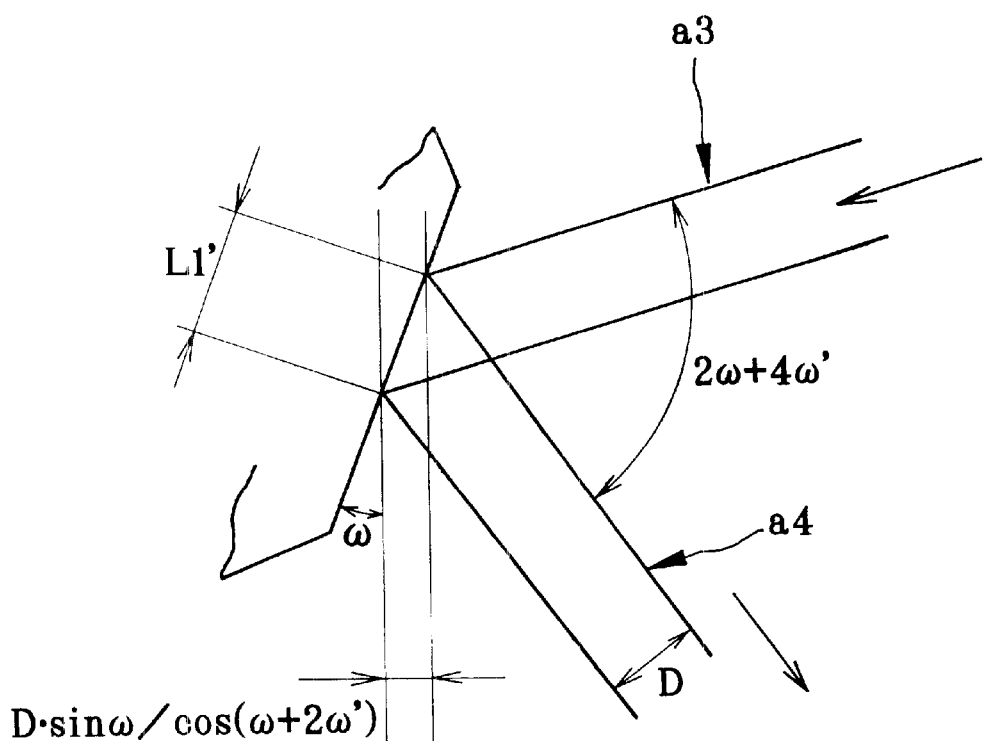
FIGS. 13($a$), 13($b$) are illustrations for explaining the twist angle $\psi 2$ generated on the second incident light beam a3 when it is assumed that the light beam a4 after second reflection is not twisted.
Figure 13B:
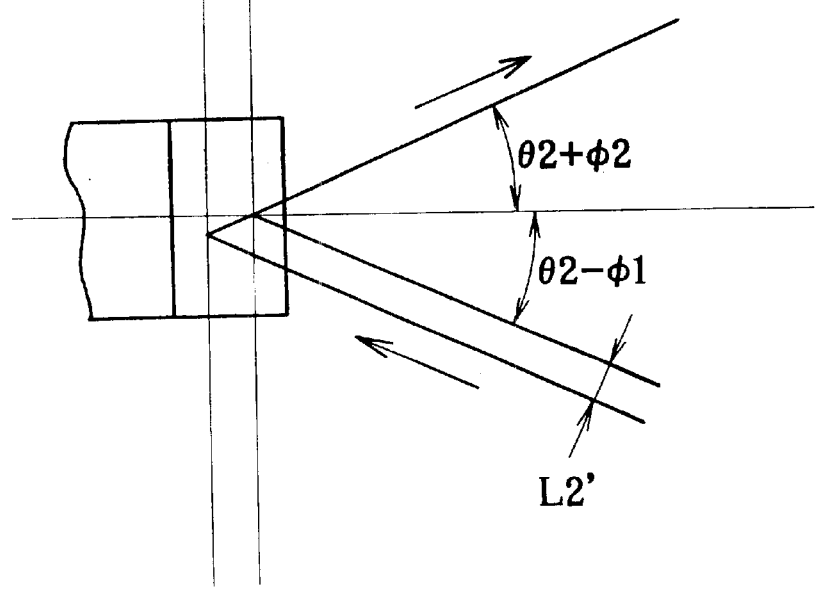
Figure 14A:
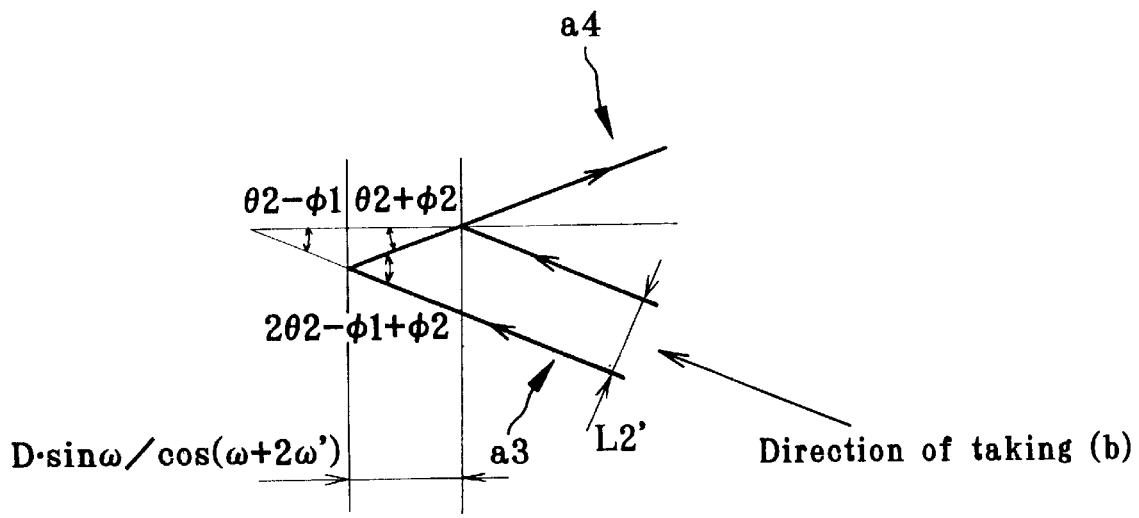
FIGS. 14($a$), 14($b$) are illustrations for explaining the twist angle $\psi 2$ generated on the second incident light beam a3 when it is assumed that the light beam a4 after second reflection is not twisted.
Figure 14B:
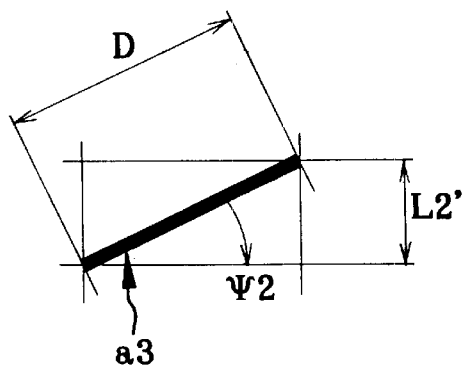

FIGS. 13(a), 13(b) and FIGS. 14(a), 14(b) are illustrations for explaining the twist angle ψ2 generated on the light beam a3 when it is assumed that the light beam a4 after second reflection is not twisted. FIG. 13(a) is an illustration in which the beams are projected on the plane perpendicular to the rotational axis 12, FIG. 13(b) is an illustration in which the beams are projected on the incident plane, FIG. 14(a) is an enlarged view showing a portion including the reflection point shown in FIG. 13(b), and FIG. 14(b) is a view showing the back of the light beam a3 as seen from behind in the proceeding direction of the light beam a3. The following equations are obtained:

$$L1' = D/\cos(\omega + 2\omega') \tag{24}$$

$$L2' = D \cdot \sin(2 \cdot \theta 2 + \phi 2 - \phi 1) \cdot \sin\omega / \{\cos(\theta 2 + \phi 2) \cdot \cos(\omega + 2\omega')\} \tag{25}$$

$$\therefore \psi 2 = \sin^{-1}[\sin(2 \cdot \theta 2 + \phi 2 - \phi 1) \cdot \sin\omega / \{\cos(\theta 2 + \phi 2) \cdot \cos(\omega + 2\omega')\}] \tag{26}$$

The following discussion will be made for the influence of curvature of the scan line relative to the twist of the light beam a4. FIGS. 15(a)–15(c) show a relation between a plane S', containing the coordinate axis 1' and the central ray of the outgoing light beam a4, and a scan plane S when the scan line b (FIG. 1) has a curvature and a deflecting angle is 2ω+2ω'. FIG. 15(a) is an illustration in which the beams are projected on the scan plane S, FIG. 15(b) is a side view showing the same as FIG. 15(a) as seen from below, and FIG. 15(c) is a view showing the front of the light beam a4 as seen from the proceeding direction of the light beam a4. From FIGS. 15(a)–15(c), the twist angle ψ3 of the light beam a4 influenced by the curvature of the scan line is given by:

$$D \cdot \cos \psi 3 \cdot \sin(2\omega+2\omega') \cdot \tan \phi 2 = D \cdot \sin \psi 3 \tag{27}$$

$$\therefore \psi 3 = \tan^{-1}\{\sin(2\omega+2\omega') \cdot \tan \phi 2\} \tag{28}$$

As shown in FIG. 2, since coordinates of the light beam a1 are converted into a mirror image in the second reflection, the aforementioned twist angle ψ1 is marked with inverse mathematical symbol. In addition, since the twist angle ψ3 shown in FIG. 15(c) has a direction of the counterclockwise direction, the twist angle ψALL after a couple of reflections is expressed by:

$$\psi ALL = \psi 2 - \psi 1 - \psi 3 \tag{29}$$

The twist angle ψALL is given from the combination of the equations (2), (20), (23), (26), (28), and (29).

Figure 16:
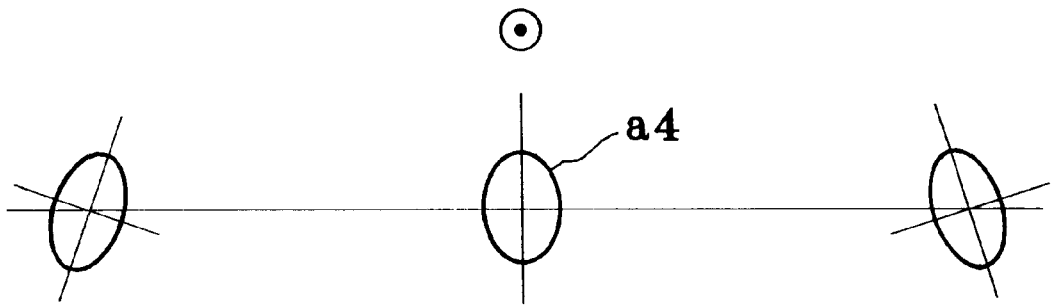
FIG. 16 is an illustration showing twist profiles of the light beam a4 at the both ends and the center along the main scanning direction when the twist is generated on the outgoing light beam a4.

FIG. 16 is a view showing the front of the light beam a4 as seen from the proceeding direction of the light beam a4 at the both ends and the center along the main scanning direction when the twist angle ψALL, not zero, is generated on the outgoing light beam a4. The twist profiles of the outgoing light beam a4 are symmetrical to each other about the sub scanning section (section parallel to the rotational axis 12).

Figure 17:
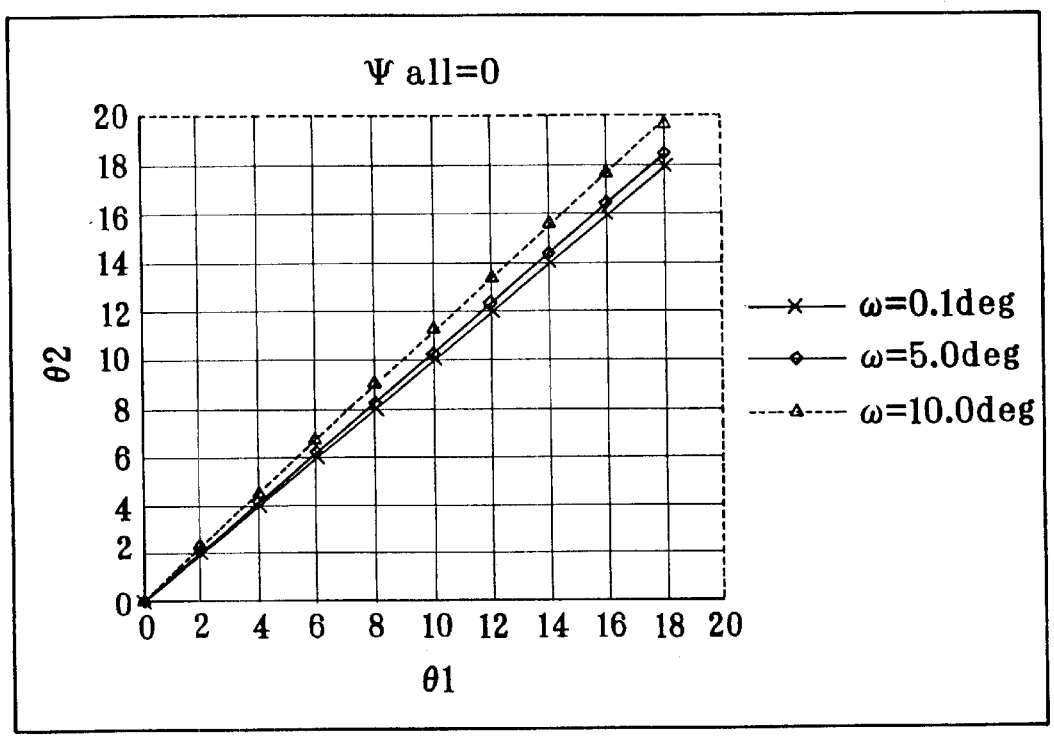
FIG. 17 is a graph for indicating conditions under which the twist angle $\psi$ALL of the outgoing light beam a4 is cancelled to be zero.
Figure 18:
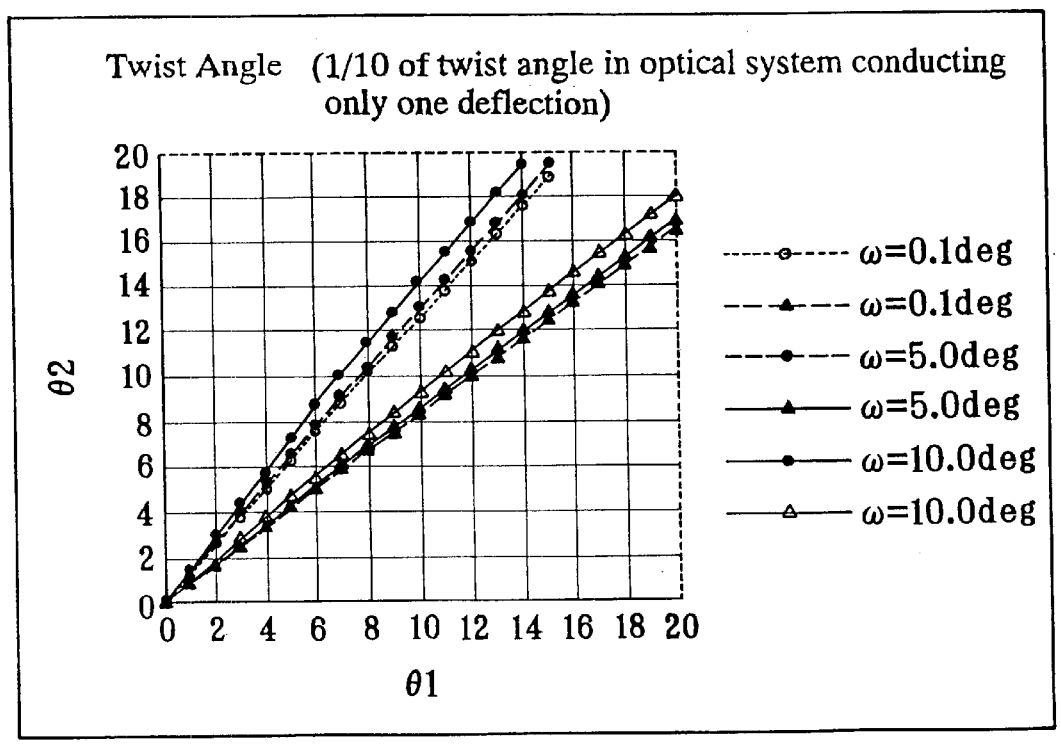
FIG. 18 is a graph for indicating conditions under which the twist angle of a beam after deflected twice becomes 1/10 or less of the twist angle of a beam in case of using a conventional optical system conducting only a single deflection.

FIG. 17 is a graph for indicating conditions under which the twist angle ψALL of the outgoing light beam a4 is cancelled to be zero, and FIG. 18 is a graph for indicating conditions under which the twist angle of the outgoing beam after deflected twice at the deflection reflecting facet becomes ¹⁄₁₀ or less of the twist angle of an outgoing beam after deflected once by using a conventional optical system conducting only a single deflection, wherein the outgoing beams of the both cases have the same deflection angle ω and the incoming beams of the both cases are incident at the same incidence angle as that shown in FIG. 1. In each graph, a range between the ○ curve and the Δ curve is a range where the twist is well corrected.

From the relation between FIG. 17 and FIG. 18, the twist of the outgoing light beam a4 is well collected when the following condition is satisfied:

$$0.92 \leq (\theta 2/\theta 1) \leq 1.25 \tag{30}$$

Particularly when the condition θ1:θ2=1:1 is satisfied, the twist on the outgoing light beam a4 can be substantially cancelled to be zero.

Problems caused by the twist of the outgoing light beam a4 from the light deflective optical system are described here. Generally a laser scanning apparatus has a tilt error correction structure incorporated therein. That is, the scanning optical system 23 is designed to establish a conjugate relationship in the sub scanning direction between the deflective reflecting facet 11 and the scanned surface 24. Since beam spots are properly scanned at the scanned surface 24, rays parallel to the main scanning direction are reflected and deflected at the deflective reflecting facet 11.

Such an optical system after the deflective reflecting facet 11 being characterized as difference in the focusing angle (or diverging angle) of the light beam a4 between the main scanning direction and the sub scanning direction is called the anamorphic optical system. To correct the tilt error of planes, at least one lens capable of providing strong power in the sub scanning direction, such as lenses with cylindrical and/or toric surfaces, is typically employed in the scanning optical system 23.

Figure 19:
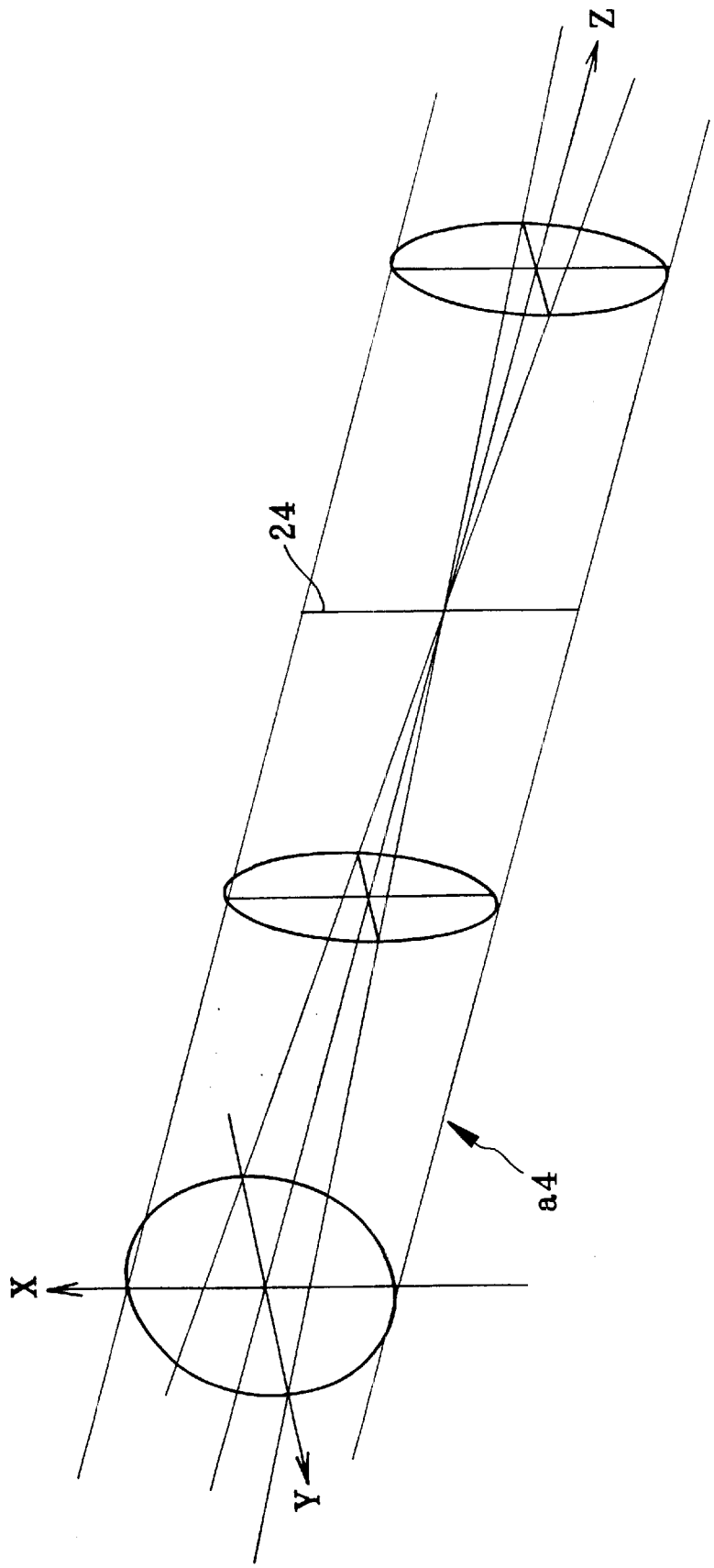
FIG. 19 is an illustration for explaining the influence of twist of a light beam by scanning.
Figure 20:
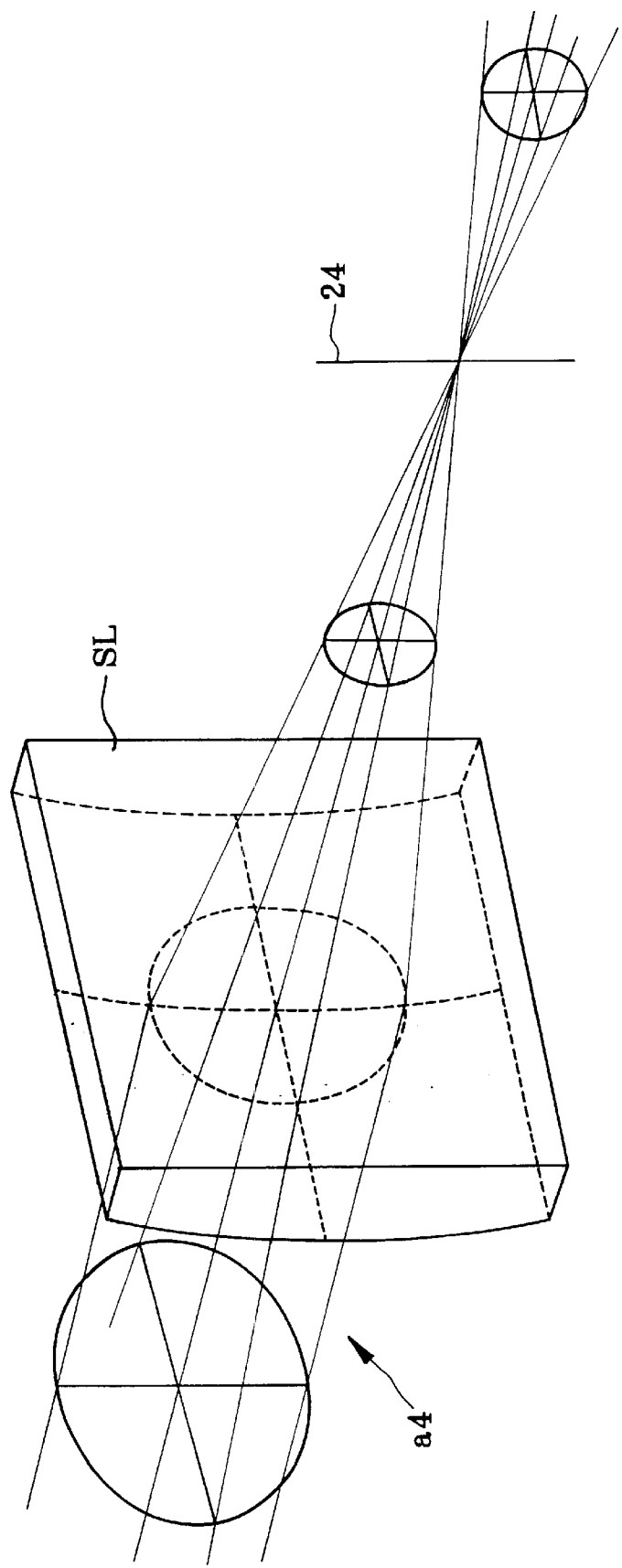
FIG. 20 is an illustration for explaining the influence of twist of a light beam by scanning.
Figure 21:
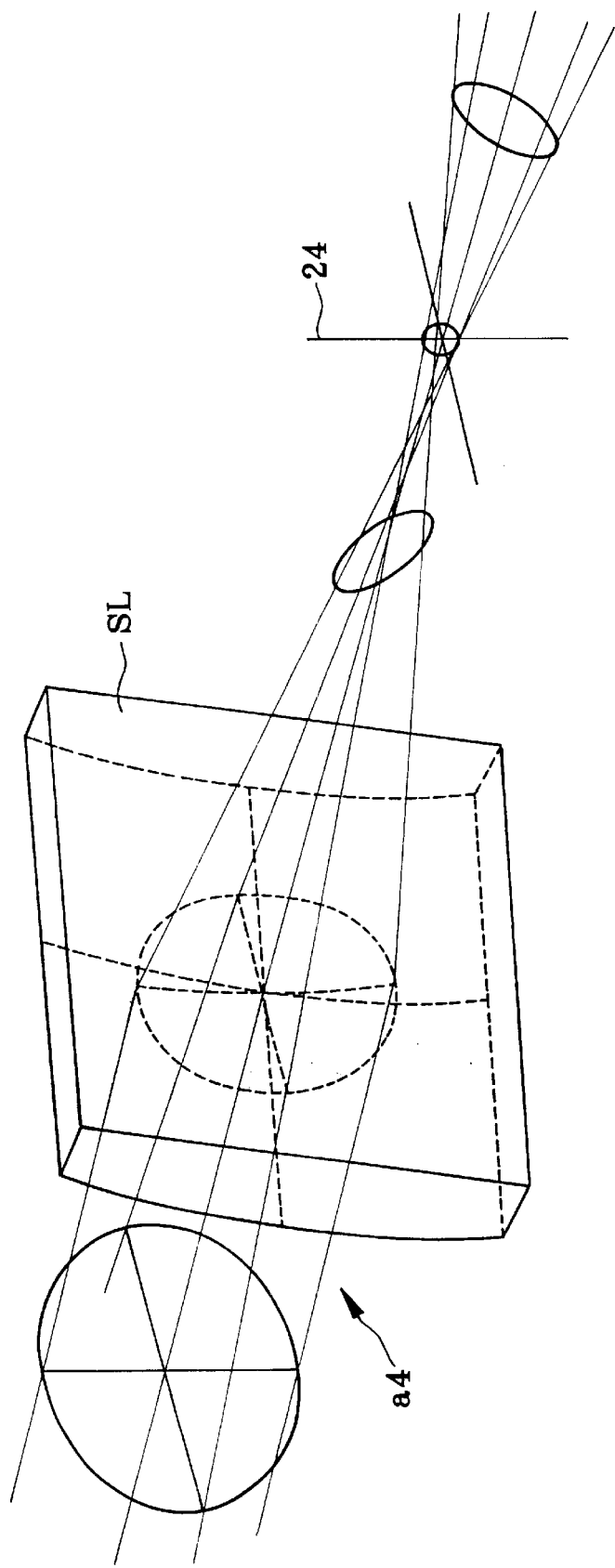
FIG. 21 is an illustration for explaining the influence of twist of a light beam by scanning.

Influence of the twist of the light beam a4 by scanning in the optical system will be studied with reference to models as shown in FIGS. 19–21. Assuming that there is a light beam a4 which is collimated in X direction and is focused in Y direction as shown in FIG. 19, the light beam a4 can be focused both in the X direction and the Y direction on the scanned surface 24 to achieve image formation as a dot by disposing a suitable cylindrical lens SL as shown in FIG. 20. The surface of the cylinder lens corresponds to the cylinder surface for correcting the tilt error. The twist of the cylinder lens SL causes astigmatism on the scanned plane 24 as shown in FIG. 21. Astigmatism is also caused by a twisted light beam a4 with the cylinder lens SL which is not twisted.

Accordingly, it is desired to minimize the twist of the outgoing light beam a4 as possible by satisfying at least the condition (30), preferably satisfying the condition of θ1:θ2≈1:1.

Figure 22:
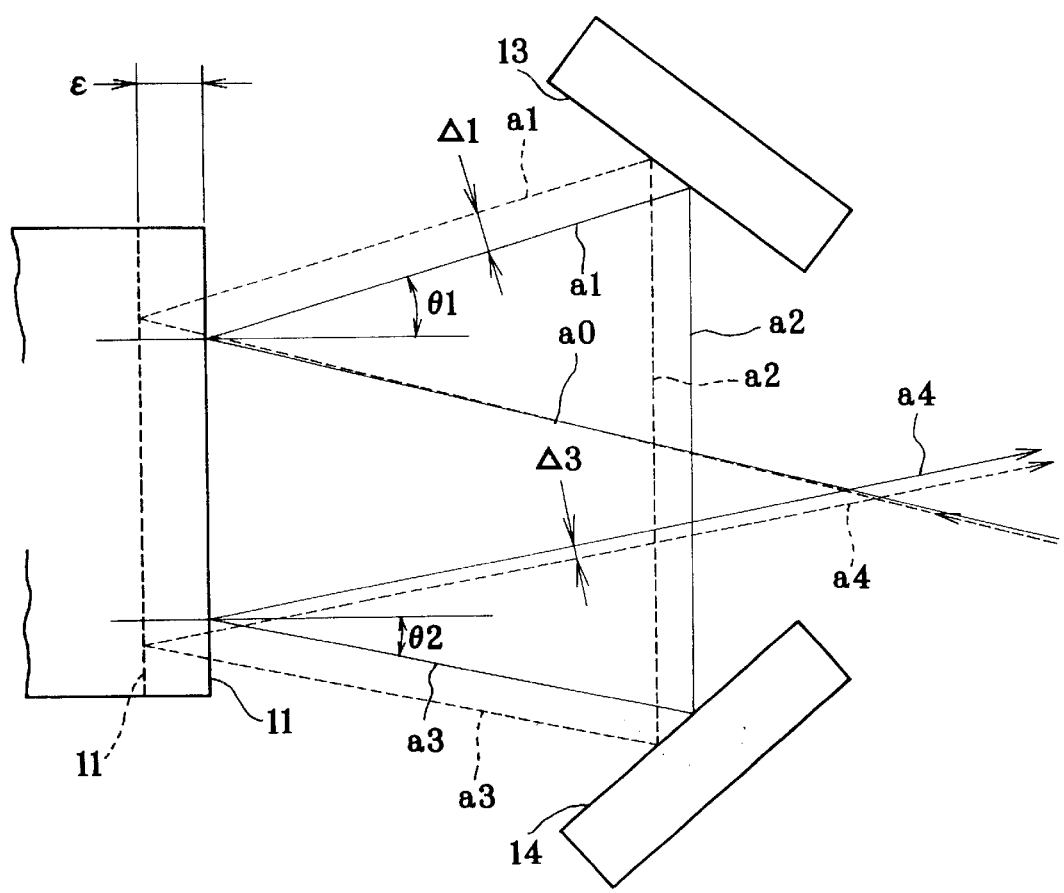
FIG. 22 is an illustration showing the influence by projecting or sinking of each deflective reflecting facet.

Hereinafter, conditions for a case that there is a projecting or sinking of the deflective reflecting facet 11 with regard to the rotational axis 12 will be considered. FIG. 22 is an illustration showing influence of the projecting or sinking of the deflective reflecting facet 11. When there is a projecting or sinking of the deflective reflecting facet 11 by a distance E as shown by a solid line and a dotted line, a shifting amount Δ1 of a beam due to the first reflection and a shifting amount Δ2 due to the second reflection are given by:

$$\Delta 1 = 2 \cdot \epsilon \cdot \sin \theta 1 \tag{31}$$

$$\Delta 2 = 2 \cdot \epsilon \cdot \sin \theta 2 \tag{32}$$

A shifting amount Δ3 of the outgoing light beam a4 due to a couple of the reflections is given by:

$$\Delta 3 = \Delta 1 - \Delta 2 \tag{33}$$

The positional shift Δ3 at the second reflection point of each reflecting facet 11 is converted to a deviation of the scan line b on the scanned surface 24 through the scanning optical system 23 between the deflective reflecting facet 11 and the scanned surface 24. Therefore, assuming the expanding definition lateral magnification in the sub scanning direction of the scanning optical system 23 as β' and the deviation of the scan line b on the scanned surface 24 as Δ, the following equation is obtained:

$$\Delta = \beta' \cdot \Delta 3 = 2 \cdot \epsilon \cdot |\beta' \cdot (\sin \theta 1 - \sin \theta 2)| \quad (34)$$

Figure 23:
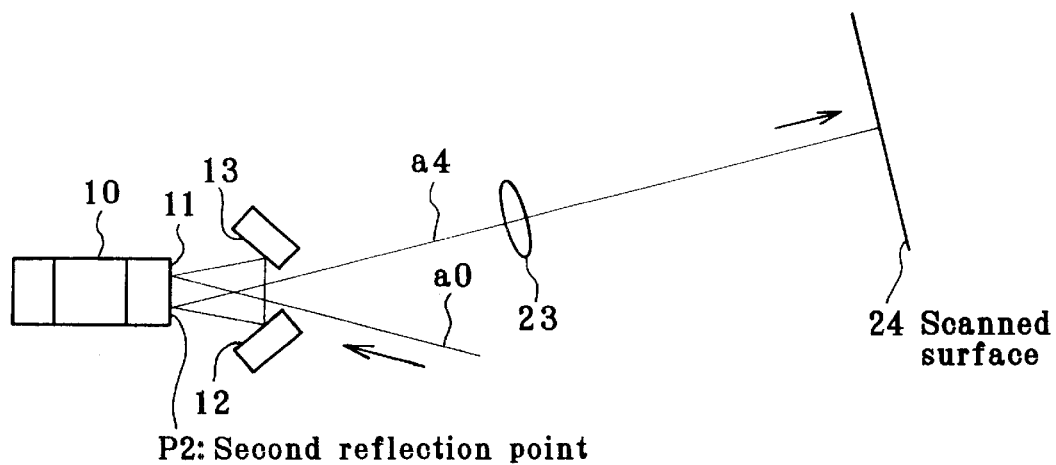
FIG. 23 is an illustration for explaining the definition of a scanning optical system.
Figure 24:
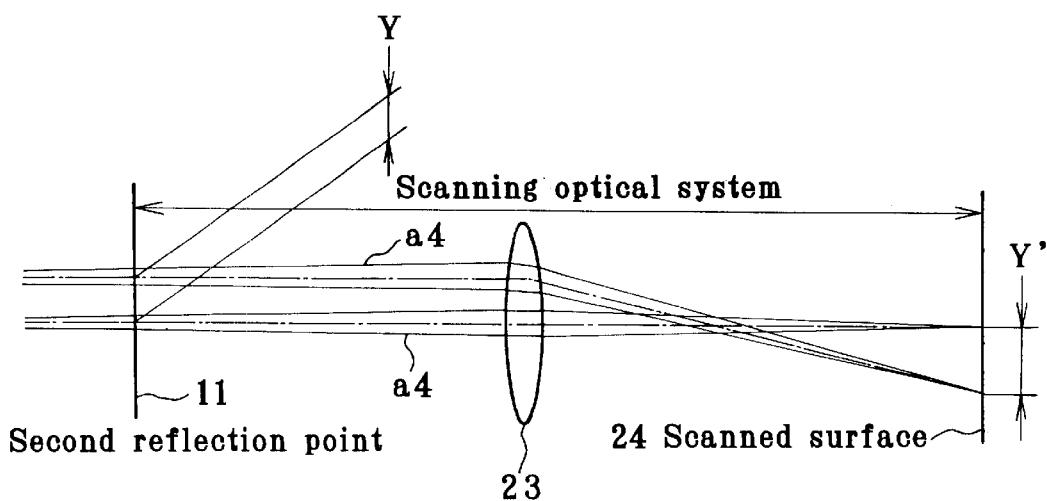
FIG. 24 is an illustration for explaining the definition of the expanding definition lateral magnification $\beta'$ in a sub scanning direction of the scanning optical system.

It should be noted that the scanning optical system 23 is an optical system between the second reflection point of the deflective reflecting facet 11 and the scanned surface 24 as shown in FIG. 23 and that the expanding definition lateral magnification $\beta'$ in the sub scanning direction of the scanning optical system 23 is defined as $\beta' = Y'/Y$, wherein Y is the shifting amount of the outgoing light beam a4 in the sub scanning direction caused by the projecting or sinking of the deflective reflecting surface 11 and Y' is the shifting amount of the scanning point in the sub scanning direction on the scanned surface 24 corresponding to the shifting amount Y as shown in a light path development in the sub scanning direction of FIG. 24.

The projecting or sinking amount $\epsilon$ of the deflective reflecting facet 11 can be estimated as an extent of 0.05 mm in case of a typical polygon mirror (rotary-type polygon mirror) 10. In case of a monochrome electrophotographic apparatus in which halftone in concentration is regarded as not so important, it is required to hold the deviation $\Delta$ of the scan line to ¼ or less of the pitch of scan lines. In case of a multi-color electrophotographic apparatus in which halftone in concentration is regarded as important, it is required to hold the deviation $\Delta$ of the scan line to ⅛ or less of the pitch of scan lines. Taking the above into consideration, the equation (34) can be converted into the following expressions: Assuming the pitch of scan lines as LP (with dimensions being in millimeters), $$0.1 \cdot |\beta' \cdot (\sin \theta 1 - \sin \theta 2)| \leq 0.25 \cdot LP \quad (35)$$

for a monochrome electrophotographic apparatus; and $$0.1 \cdot |\beta' \cdot (\sin \theta 1 - \sin \theta 2)| \leq 0.125 \cdot LP \quad (36)$$

for a multi-color electrophotographic apparatus. The incidence angle $\theta 1$ and the outgoing angle $\theta 2$ of the outgoing light beam a4 relative to the deflective reflecting facet 11 should be chosen such that the above condition is satisfied.

As apparent from the equation (34), as the condition $\theta 1 = \theta 2$ is satisfied, the deviation of the scan line due to projecting or sinking of the deflective projecting facet 11 with regard to the rotational axis 12 is completely absent, i.e. zero. From this point of view, this arrangement is ideal.

As described in the above, according to the present invention, a light deflective optical system has at least one deflective reflecting facet 11, parallel to a rotational axis 12 and capable of being revolved or swiveled about the rotational axis 12, and two stationary plane mirrors 13, 14, disposed to face the deflective reflecting facet 11, wherein a light beam a1 incident on and thus reflected at the deflective reflecting facet 11 is reflected successively at the stationary plane mirrors 13, 14 and this reflected light beam a3 is again incident on and reflected at the deflective reflecting facet 11. The two stationary plane mirrors 13, 14 are disposed perpendicularly to the incident plane to have a space 15 therebetween on the condition that the incident plane is a face containing a light beam a0 to be first incident on the deflective reflecting facet 11 and being parallel to the rotational axis 12. The light beam a0 to be first incident on the deflective reflecting facet 11 passes through the space 15 between the stationary plane mirrors 13, 14 and the light beam a4 after second reflection at the deflective reflecting facet 11 outputs through the space 15. That is, since neither of the two stationary plane mirrors 13, 14 is interposed between the incoming light beam a0 and the outgoing light beam a4, the mirrors may have larger width. Therefore, cheaper high precise plane mirrors which are easy to be processed can be employed as the stationary plane mirrors.

Since the incidence angle $\theta 1$ of the incoming light beam a0 and the outgoing angle $\theta 2$ of the outgoing light beam a4 are made substantially equal to each other when the deflective reflecting facet 11 is directed squarely, variation in pitch of scan lines can be prevented even with projecting or sinking of the deflective reflecting facet 11, and the outgoing light beam a4 can be prevented from twisting.

Though polygon mirror (rotary-type polygon mirror) 10 is employed to be composed of the deflective reflecting facets 11 in the above description, swiveling Galvano mirror may be employed to exhibit the same effect.

Though the description was made as regard to the light deflective optical system of the present invention based on its principle and the embodiments, the present invention is not limited thereto and various changes and modifications may be made.

As apparent from the above description, in the light deflective optical system of the present invention, variation in deflective light beam in the outgoing direction due to tilt of the rotational axis of the deflective reflecting facets and/or tilt of each deflective reflecting facet is completely corrected. Moreover, in this system, wider deflecting angle can be achieved and relatively wide plane mirrors can be employed as the stationary plane mirrors. That is, cheaper high precise plane mirrors which are easy to be processed can be employed as the stationary plane mirrors. In addition, variation in pitch of scan lines can be prevented even with projecting or sinking of the deflective reflecting facet and the outgoing light beam can be prevented from twisting.

What we claim is:

1. A light deflective optical system comprising at least one deflective reflecting facet, parallel to a rotational axis and capable of being revolved or swiveled about said rotational axis, and two stationary plane mirrors, disposed to face the deflective reflecting facet, wherein a light beam incident on and thus reflected at said deflective reflecting facet is reflected successively at said two stationary plane mirrors and this reflected light beam is again incident on and reflected at said deflective reflecting facet, being characterized in that said two stationary plane mirrors are disposed perpendicularly to an incident plane to have a space therebetween on the condition that said incident plane is defined as a face containing a light beam to be first incident on said deflective reflecting facet and being parallel to said rotational axis, and the light beam to be first incident on said deflective reflecting facet passes through the space between said two stationary plane mirrors and the deflected light beam after second reflection at said deflective reflecting facet outputs through the space between said two stationary plane mirrors.

2. A light deflective optical system as claimed in claim 1, being characterized in that the following condition is satisfied:

$$0.92 \leq (\theta 2/\theta 1) \leq 1.25 \quad (30)$$

wherein $\theta 1$ indicates the incidence angle of the light beam to be first incident on said deflective reflecting facet relative to said deflected reflecting facet under conditions that said incident plane contains the deflected light beam of the first reflection and $\theta 2$ indicates the outgoing angle of the deflected light beam of the second reflection at said deflective reflecting facet under conditions that said incident plane contains the deflected light beam of the second reflection.

3. A light deflective optical system as claimed in claim 1, being characterized in that the following condition is satisfied:

$$0.1 \cdot |\beta' \cdot (\sin \theta_1 - \sin \theta_2)| \leq 0.25 \cdot LP \quad (35)$$

wherein, assuming the shifting amount of the outgoing light beam in a section containing said rotational axis as Y which is generated due to projecting or sinking of said deflective reflecting facet with respect to said rotational axis and assuming the shifting amount of the scanning point on a scanned surface corresponding to the shifting amount Y as Y' which is generated due to an optical system between the second reflection point on said deflective reflecting facet and the scanned surface, $\beta'$ is defined as $\beta'=Y'/Y$ and LP is the pitch of scan lines on said scanned surface, with dimensions being in millimeters.

4. A light deflective optical system as claimed in claim 3, being characterized in that the following condition is satisfied:

$$0.1 \cdot |\beta' \cdot (\sin \theta_1 - \sin \theta_2)| \leq 0.125 \cdot LP \quad (36)$$

with dimensions being in millimeters.

5. A light deflective optical system as claimed in any one of claims 1 through 4, being characterized by satisfying the condition of $\theta_1:\theta_2 \approx 1:1$.

6. An image forming apparatus, being characterized in that a light deflective optical system as claimed in any one of claims 1 through 5 is used for exposure during image writing process.

* * * * *